US006848267B2

(12) United States Patent
Pierson

(10) Patent No.: US 6,848,267 B2
(45) Date of Patent: Feb. 1, 2005

(54) PACKAGED CHILLING SYSTEMS FOR BUILDING AIR CONDITIONING AND PROCESS COOLING

(75) Inventor: Tom L. Pierson, Sugar Land, TX (US)

(73) Assignee: TAS, Ltd., Houston, TX (US)

( * ) Notice: Subject to any disclaimer, the term of this patent is extended or adjusted under 35 U.S.C. 154(b) by 0 days.

(21) Appl. No.: 10/357,615

(22) Filed: Feb. 4, 2003

(65) Prior Publication Data

US 2004/0016245 A1 Jan. 29, 2004

Related U.S. Application Data

(63) Continuation-in-part of application No. 10/206,856, filed on Jul. 26, 2002, now Pat. No. 6,769,258.

(51) Int. Cl.[7] .............................................. F25D 19/04
(52) U.S. Cl. ............................. 62/299; 62/431; 62/435; 62/448
(58) Field of Search ......................... 62/448, 298, 299, 62/435, 431, 175

(56) References Cited

U.S. PATENT DOCUMENTS

| | | | | |
|---|---|---|---|---|
| 2,336,066 A | * | 12/1943 | Cain ........................ | 62/435 X |
| 2,689,467 A | * | 9/1954 | Verber ...................... | 62/435 X |
| 3,148,513 A | * | 9/1964 | Ewing ...................... | 62/435 X |
| 4,244,517 A | | 1/1981 | Stanke et al. ................ | 236/49 |
| 4,446,703 A | | 5/1984 | Gilbertson .................. | 62/113 |
| 4,792,091 A | | 12/1988 | Martinez, Jr. ............... | 237/19 |
| 4,926,649 A | | 5/1990 | Martinez, Jr. ............... | 62/99 |
| 5,111,875 A | | 5/1992 | Hammarstedt ............... | 165/50 |
| 5,894,739 A | | 4/1999 | Temos ...................... | 62/436 |
| 6,185,946 B1 | | 2/2001 | Hartman .................... | 62/175 |
| 6,209,330 B1 | | 4/2001 | Timmerman et al. ......... | 62/179 |
| 6,405,549 B1 | * | 6/2002 | Baffes ...................... | 62/188 |
| 6,422,018 B1 | | 7/2002 | Tisdale et al. ............... | 60/728 |

* cited by examiner

Primary Examiner—Harry B. Tanner

(57) ABSTRACT

Disclosed is a packaged chilling system for providing chilled water to an air conditioning system for a building that includes: a duct system; an air handling system; and a water chilling system; wherein: the duct system is in operable communication with a building that has a plurality of rooms, at least one of the rooms having a sensor for detecting the room air temperature in the room, the duct system comprising at least one supply duct for directing low temperature air from the air handling system to the building and at least one return duct for directing high temperature air from the building to the air handling system; the air handling system includes a plurality of air handling units, each air handling unit comprising an air inlet for receiving high temperature air from the building, a cooling coil that includes at least one conduit through which chilled water flows, the cooling coil having multiple passes and positioned for heat transfer contact with the high temperature air, and a fan for increasing the velocity of air in the air handling unit; the water chilling system is installed at a location proximate the building, and is operably connected to the air handling system; and the water chilling system includes a moveable support structure comprising a support base on which a plurality of water chilling system components are affixed, the components including at least one water chiller for lowering the temperature of water from a high temperature to a low temperature. This packaged chilling system may also be used to provide chilled water to industrial processes such as chemical plants, automotive plants, textile mills, paper mills, computer cooling, and factory air-conditioning.

38 Claims, 9 Drawing Sheets

PACKAGED CHILLING SYSTEMS FOR BUILDING AIR CONDITIONING AND PROCESS COOLING

CROSS-REFERENCE TO RELATED APPLICATIONS

This application is a continuation in part and claims priority to U.S. patent application Ser. No. 10/206,856 filed Jul. 26, 2002, now U.S. Pat. No. 6,769,258 which claims priority to co-pending U.S. patent application Ser. No. 09/961,711 filed Sep. 24, 2001, which claims priority to U.S. patent application Ser. No. 09/369,788 filed Aug. 6, 1999, now U.S. Pat. No. 6,318,065.

BACKGROUND OF THE INVENTION

1. Field of Inventions

The inventions described herein generally relate to air conditioning, and particularly to air conditioning systems for buildings and process cooling.

2. Description of the Related Art

A continuing need exists for improved air conditioning systems for buildings, particularly large, multi-room and multi-level buildings, e.g., schools, office buildings, hospitals and sports facilities, such as arenas. A variety of air conditioning systems have been proposed and developed, including those described in earlier patents identified on the cover page of this patent. Persons skilled in the art have recognized various challenges in designing systems that can be used to control the inside air temperatures in common areas and different rooms of those buildings. However, installing air conditioning systems and the components of air conditioning systems presents challenges as well. Installing an air conditioning system is not as simple as it might appear, particularly when the air conditioning system is associated with a building that has numerous rooms, each requiring individual temperature control. Installing air conditioning systems for large buildings and building systems is often highly complex, requiring the selection and coordination of air conditioning equipment, control systems, electrical switchgear, building materials and supplies, and also organizing the various subcontractors and construction workers, and securing building permits, etc.

SUMMARY

One or more embodiments of air conditioning systems for buildings includes a duct system; an air handling system; and a water chilling system. The duct system is preferably in operable communication with a building that has a plurality of rooms, at least one of the rooms having a sensor for detecting the room air temperature in the room, the duct system including at least one supply duct for directing low temperature air from the air handling system to the building and at least one return duct for directing high temperature air from the building to the air handling system. The air handling system preferably includes a plurality of air handling units, each of which preferably includes an air inlet for receiving high temperature air from the building and a cooling coil that includes at least one conduit through which chilling water flows. The cooling coil preferably has multiple passes and is positioned for heat transfer contact with the high temperature air, and also includes a fan for increasing the static pressure of air in the air handling unit. The water chilling system is preferably installed at a location proximate the building, and is operably connected to the air handling system cooling coil. The water chilling system preferably includes a moveable support structure including a support base on which a plurality of water chilling system components are affixed, the components including at least one water chiller for lowering the temperature of chilling water from a high temperature to a low temperature.

One or more of the air conditioning systems described herein includes a plurality of room ducts, each room duct leading to the individual rooms.

One or more of the air conditioning systems described herein preferably includes a water chiller that includes a first chiller and a second chiller, the first and second chillers being arranged in series such that chilling water is capable of sequentially passing through the first and second chillers. In addition, for chillers with water cooled condensers it is preferable to also sequentially pass cooling water from the cooling tower through the condensers of the two chillers in series and counterflow to the direction of the chilled water.

One or more of the air conditioning systems described herein preferably includes a water chilling system that includes two or more water chillers that are configured such that chilling water is capable of passing sequentially through each of the two or more water chillers, the water being chilled to one temperature after passing through the first water chiller, the same water being chilled to a second temperature after passing through the second water chiller.

One or more of the air conditioning systems described herein preferably has at least one water chiller that includes a first mechanical chiller and a second mechanical chiller, the first and second mechanical chillers being arranged in series, wherein chilling water leaving the second mechanical chiller has a lower temperature than the temperature of the chilling water leaving the first mechanical chiller.

In one or more of the air conditioning systems described herein at least one water chiller preferably includes a first water chiller and a second water chiller, the first and second water chillers being arranged in series and configured to provide a staged water temperature drop of a high water temperature of from about 45° F. to about 75° F. to a lower water temperature of from about 34° F. to about 55° F.

In one or more of the air conditioning systems described herein at least one water chiller includes a first water chiller and a second water chiller, the first and second water chillers being arranged in series and configured to provide a staged water temperature drop of a high water temperature of from about 48° F. to about 60° F. to a lower water temperature of from about 36° F. to about 45° F.

In one or more of the air conditioning systems described herein, the high temperature air has a temperature of from about 100° F. to about 50° F. and the low temperature air has a temperature of from about 45° F. to about 60° F.

In one or more of the air conditioning systems described herein, the high temperature air has a temperature of from about 80° F. to about 60° F. and the low temperature air has a temperature of from about 40° F. to about 70° F.

In one or more of the air conditioning systems described herein at least one water chiller is or includes a mechanical chiller or an absorption chiller.

In one or more of the air conditioning systems described herein at least some of the water chilling system components are pre-assembled on the moveable support structure, being affixed to the support base before the water chilling system is installed proximate the building.

In one or more of the air conditioning systems described herein the support base includes a frame that includes a plurality of steel I-beams on which a metal plate is affixed.

In one or more of the air conditioning systems described herein the water chilling system further includes a housing removably affixed to the moveable substructure, the housing sized and configured to enclose the plurality of components.

One or more of the air conditioning systems described herein additionally includes a water temperature sensor operably connected to the chilling water passing through the cooling coil, and further including a controller responsive to the water temperature sensor, capable of adjusting either the temperature or the flowrate of the chilling water.

One or more of the air conditioning systems described herein additionally includes a water temperature control system operably connected to the at least one water chiller, for adjusting the temperature of the water passing through the at least one water chiller.

One or more of the air conditioning systems described herein additionally includes a water temperature control system and a temperature sensor configured to measure the temperature of the high temperature air from the building air conditioning system for adjusting the temperature or flow of the chilling water passing through the at least one water chiller.

One or more of the air conditioning systems described herein additionally includes a chilled water thermal energy water storage tank that is operably connected to the water chiller.

One or more of the air conditioning systems described herein additionally includes a cooling tower, preferably one that is affixed above the moveable support structure.

In one or more of the air conditioning systems described herein, the air conditioning system additionally includes a cooling tower, in which: (a) the support base is a lower support base on which the plurality of water chilling system components are affixed; (b) the moveable support structure additionally includes an upper support base positioned above the lower support base upon which the cooling tower is mounted.

In one or more of the air conditioning systems described herein, the water chilling system is assembled before it is installed at the location proximate the building, such that the assembled water chilling system includes at least one base, at least one water chiller, and at least one chilled water circulation pump. Preferably the assembled water chilling system will also include at least one pump suction strainer, at least one expansion tank, at least one isolation valve, at least one motor starter and at least one control system. Preferably all piping is prefabricated and installed on the system prior to shipment to the jobsite such that all water piping is brought to the battery limits of the base. Preferably all electrical wiring for both power wiring and controls wiring is preinstalled on the system prior to shipment to the jobsite such that field interconnecting wiring is minimized. Optionally a cooling tower and support structure and connecting piping is also assembled before it is installed at the location proximate the building, such that the assembled water chilling system includes at least one cooling tower cell & motor, at least one condenser water circulation pump, and at least one motor starter.

One or more of the air conditioning systems described herein includes a duct system; an air handling system; and a modular water chilling system; wherein: the duct system is in operable communication with a building that has a plurality of rooms, at least one of the rooms having a room air temperature sensor for detecting the room air temperature in the room, the duct system including at least one supply duct for directing low temperature air from the air handling system to the building and at least one return duct for directing high temperature air from the building to the air handling system; the air handling system includes a plurality of air handling units, each air handling unit including an air inlet for receiving high temperature air from the building, a cooling coil that includes at least one conduit through which chilled water flows, the cooling coil having multiple passes and positioned for heat transfer contact with the high temperature air, and a fan for increasing the static pressure of air in the air handling unit; the modular water chilling system is installed at a location proximate the building, and is operably connected to the air handling system; the modular water chilling system includes at least one moveable support structure, each structure including a support base on which a plurality of water chilling system components are affixed, the components on the total sum of the one or more support base including at least one water chiller for lowering the temperature of water from a high temperature to a low temperature, wherein the high water temperature coming from the building air handling system or process is from about 45° F. to 75° F. and is chilled through the chilling system to a low temperature of from about 34° F. to 55° F. which is then supplied back to the building air handling system or process.

BRIEF DESCRIPTION OF FIGURES

Aspects of specific embodiments of the inventions are shown in the drawings for illustrative purposes only. Some of the drawings have similar or even identical parts and components, and like parts will be given like reference numbers even though at some level of detail the parts may not necessarily be identical.

DETAILED DESCRIPTION

A. Introduction and Definitions

Figure 1:
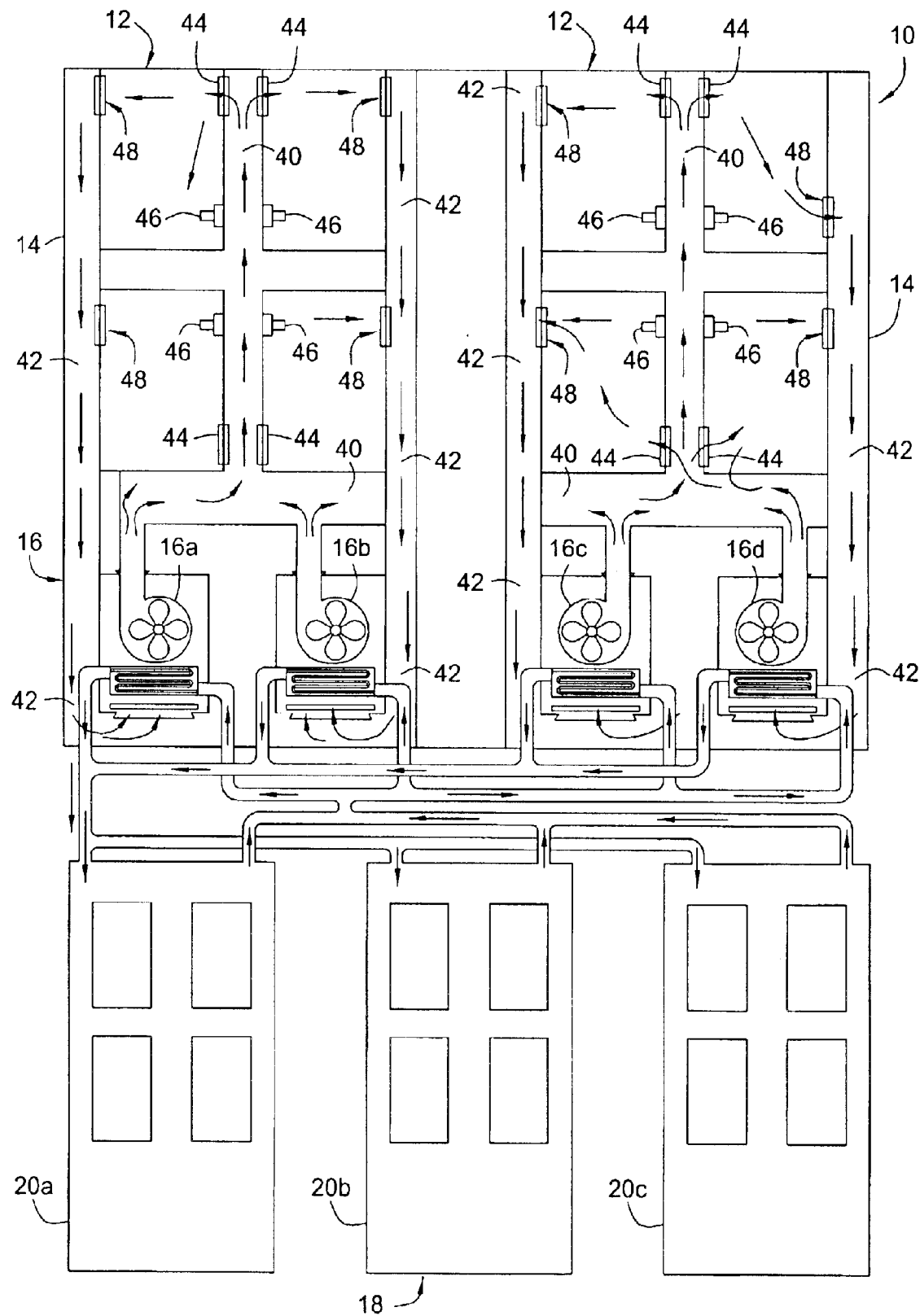
FIG. 1 is a top schematic view of a specific embodiment of an air conditioning system for buildings having multiple chillers (not drawn to scale).

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

The term "building" as used herein refers to any enclosed structure having outer walls and a plurality of rooms (more than one room), wherein the rooms are designed to be occupied by people and maintained at a temperature that is different than the outside temperature, thus requiring cooling. A specific type of building is a multi-level building, which has multiple levels or floors, e.g., a "high-rise" office building or apartment. A multilevel building typically has at least some individual rooms located above other individual rooms. The term "building system" refers to a plurality of buildings.

In at least one specific embodiment, the building is a hospital building. The hospital building includes individual hospital rooms, each preferably having an individual room air temperature sensor. In that embodiment, a hospital air conditioning system includes a duct system; an air handling system; and a water chilling system; wherein the water chilling system is installed at a location proximate the hospital building, and is operably connected to the air handling system. Preferred aspects of the duct system, air handling system and water chilling are described herein.

In another specific embodiment, the building is an office building, e.g., a commercial office building that preferably is a multi-level building, more preferably having at least three (3) floors connected by stairs and/or elevators. In that embodiment, an office building air conditioning system includes a duct system; an air handling system; and a water chilling system; wherein the water chilling system is installed at a location proximate the office building, preferably on the roof or on an adjoining parking garage (or between the building and the parking garage) or on the ground proximate the building. Preferred aspects of the duct system, air handling system and water chilling system are described herein.

In another specific embodiment, the building is a school building, e.g., a grade school, middle school, junior high school, or high school building. Or the school building can also be a college or university school building. A school building is preferably part of a larger school building system, e.g., different buildings that may either share a common air conditioning system, or a common water chilling system, or have different air conditioning systems or water chilling systems. In certain embodiments, the building will be a single story building; while in other embodiments, the building will be a multi-level building, having multiple stories. In the school building embodiment, a school building air conditioning system includes a duct system; an air handling system; and a water chilling system; wherein the water chilling system is installed at a location proximate the school building. Preferred aspects of the duct system, air handling system and water chilling are described herein.

In another specific embodiment, the building is a shopping mall building, which may include not only individual units, e.g., retail units, but also a common passageway shared by a plurality of the individual units. Typically a shopping mall building will be extremely large, with a floor area ranging anywhere from 200,000 ft$^2$ to 1,000,000 ft$^2$, or higher, e.g., up to 3,000,000 ft$^2$. In certain embodiments, the building will be a single story building; while in other embodiments, the building will be a multi-level building, having multiple stories. In the school building embodiment, a school building air conditioning system includes a duct system; an air handling system; and a water chilling system; wherein the water chilling system is installed at a location proximate the school building. Preferred aspects of the duct system, air handling system and water chilling are described herein.

Unless otherwise specified, or apparent from the context, all references herein to "circulating water", "water" or "chilling water" refer broadly to any portion or all of the circulating water being used in the system, although in certain cases it will be apparent from the context that a reference to "circulating water" or "water" refers only to a selected portion of the circulating water in the system (e.g. when the temperature of a particular portion of circulating water is identified, in which case the temperature of other portions of circulating water in other parts of the system may not necessarily be the same). The water may or may not also contain small amounts of chemicals for inhibiting biological growth or for freeze prevention in the circulating water system.

The term "load" as used herein, refers to the heat gain in the building or process that is to be cooled by the circulating chilling water.

The term "prewired" as used herein, refers to wiring the component, e.g., control systems or motor starters, prior to delivery to a location proximate a building.

Certain embodiments described herein relate to methods (i.e., processes) and apparatus for providing chilled water or hot water or steam for air conditioning and heating applications associated with large buildings such as universities, hospitals, schools, commercial and government office buildings, shopping malls, sports facilities (including arenas and domed complexes), internet server farms or computer cooling, industrial processes and manufacturing facilities. More specifically, certain embodiments utilize a modular, mass produced "package" that can be pre-engineered and manufactured in a factory environment, then shipped to a jobsite, i.e., a location next to a building that is to be air conditioned. Such a "package" (as it is sometimes referred to herein) preferably includes all the key mechanical and electrical equipment required or desired to provide chilled water or steam at a central facility that can be piped to various air handling units or process loads to provide heating or cooling. That is, in a most desirable embodiment, the package is a "turnkey" apparatus, i.e., requiring minimal amounts of on-site labor to install.

Systems that are different from the one claimed herein may suffer from various disadvantages, particularly in the installation phase. A hypothetical system will now be described, i.e., a large building or industrial facility that utilizes a centrally located chilled water plant to supply chilled water and hot water or steam as well. Such a central plant is typically built at the site using available local craftsmen, even though they may not have the specialized skills or tools needed for efficiently installing air conditioning systems or circulating chilled water systems. Such a plant would need to be individually engineered on a case-by-case basis and, once the specification is completed, the owner or developer would need to issue the specification to various mechanical or general contractors who would then bid out the equipment to be provided along with estimating all of the construction costs to develop the bid. The successful contactor would then pour a foundation and construct a building complete with lighting and fire protection features. The contractor would then also purchase additional mechanical equipment such as water chillers, circulating pumps, motor control centers, control systems, piping, insulation, valves, strainers, expansion tanks, fittings, chemical feed systems, refrigerant gas detection, ventilation & alarm systems. These various pieces of equipment would then be shipped to the jobsite and erected in the building using the contractor's labor crews or that of his subcontractors. Typically, the overall facility or plant would be unique in terms of having different footprints, and different components and arrangements components, to which there is very little standardization. These field installed systems also do not normally benefit from the high quality and repeatability available in a factory environment where ISO quality procedures can be developed and maintained. Finally, these chiller plants are very difficult to move to a different location which limits the flexibility for the owner and may make financing more difficult.

Such large tonnage plants would in all likelihood utilize field erected cooling towers or modular cooling towers located close to, but away from the building that houses the mechanical equipment. Accordingly, piping would need to be installed (again, using local labor) to carry high temperature water from the central plant to the cooling tower; and additional piping would need to be installed to carry the lower temperature water (pre-chilled) back from the cooling tower to the central plant. This field erection of the cooling tower, cooling water pumps, water piping, and associated wiring increases cost and installation schedule, which is subject to local labor and climatic conditions. The remote cooling tower also requires significant plot space. A heating system could also be located in the same central plant building or in an adjacent heating building. Such a heating system would be designed and installed in a manner similar to that of the water chilling system, described above. The engineer would then be expected to specify the type of boiler or water heater and the pumps and motor control centers; and the contractor would then construct an entire stand-alone building to house the equipment, and also to purchase and field install all of this equipment and complete all of the piping and electrical installation at the site, e.g., at a location next to the building.

Such a central plant could be built for a single large building or process load, but more likely, if multiple buildings or process loads existed in reasonable proximity to one another, the central plant would furnish chilled water and steam or hot water to all of the neighboring buildings by means of a common piping that brings all of the loads to one central plant.

In contrast to the central plant described above, certain embodiments of the present invention (reflected in one or more of the claims) provide an improved approach. For example, in certain embodiments, a pre-engineered packaged system can be manufactured in a factory environment where skilled workers can be used to assemble the components and even to test them. Such a system preferably utilizes a modular construction, such that each module (which may include so-called "sub-modules") has at least some components that are standardized, pre-designed and pre-fabricated. Those components are preferably designed so that they can be combined in different ways to meet a wide variety of project requirements. Moreover, they are preferably designed so that the overall number of components is minimized such that each component or module is sized such that it can be shipped by truck cost-effectively. Preferably, each module includes a separate support base, which is preferably in the nature of a foundation base constructed of structural steel. Major mechanical components can be designed, constructed, assembled, or purchased in advance, then placed on the support base or used as sub-assemblies for manufacturing the modular package. Such equipment, some of which falls under the category of "components" below, may include one or more water chillers (described in detail below). Mechanical chillers may include (or have associated therewith) one or more drivers, e.g., one or more electric motors, steam turbines, gas turbines, turboexpanders, or engines. Alternatively the chiller may be an absorption chiller such that steam or hot water or natural gas is used as the energy source rather than rotational energy. The equipment may also include prepiped chilled water circulating pumps, condenser water circulating pumps, pump suction strainers, chilled water expansion tanks, water piping, insulation, isolation valves, prewired control systems, prewired motor starters for all compressor motors, pump motors, and cooling tower fan motors, etc. The equipment is preferably mounted on a structural steel base, and the equipment and base is preferably enclosed with wall panels to provide weather protection for the equipment. Such wall panels preferably have doors located as desired or necessary to provide an entry for operating and maintenance personnel. The wall panels may also be designed to be removable to provide for even more convenient access during major maintenance events. The enclosure preferably has a refrigerant gas detection system which is interlocked through the control system to activate an exhaust fan and an alarm if a high level of gas is detected. In certain embodiments, the equipment and base will preferably ship without any enclosure panels to allow it to be mounted inside a building or behind an architectural facade to allow this mechanical room to match the architecture of the surrounding buildings.

Figure 2:
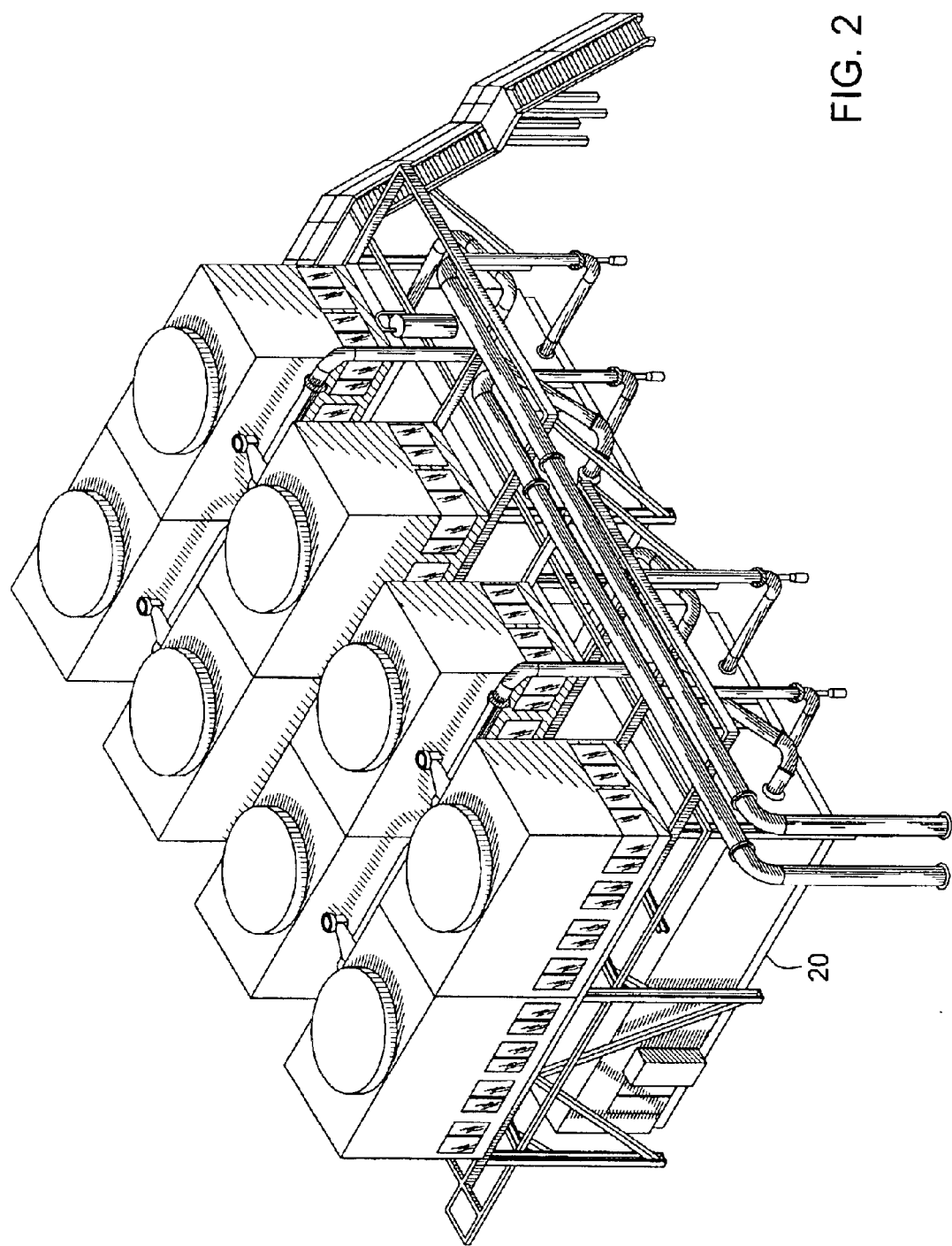
FIG. 2 is a perspective view of a specific embodiment of an air conditioning system showing both the lower support structure and the upper support structure with the cooling tower.
Figure 5A:
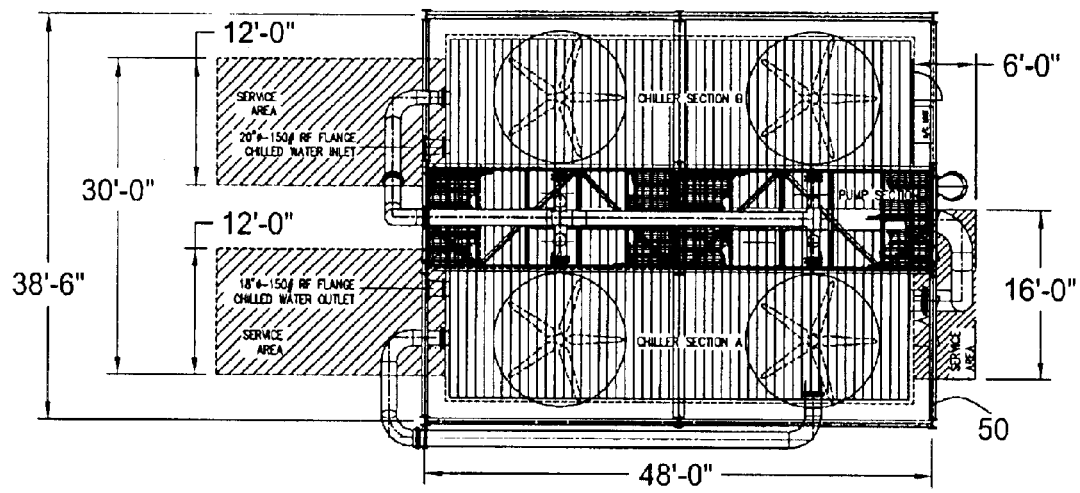
FIG. 5 is a diagram showing possible dimensions and layout of a specific embodiment of a chilling system with two duplex chillers for larger building chilling systems in the size range of 3500 to 6100 tons.
Figure 5B:
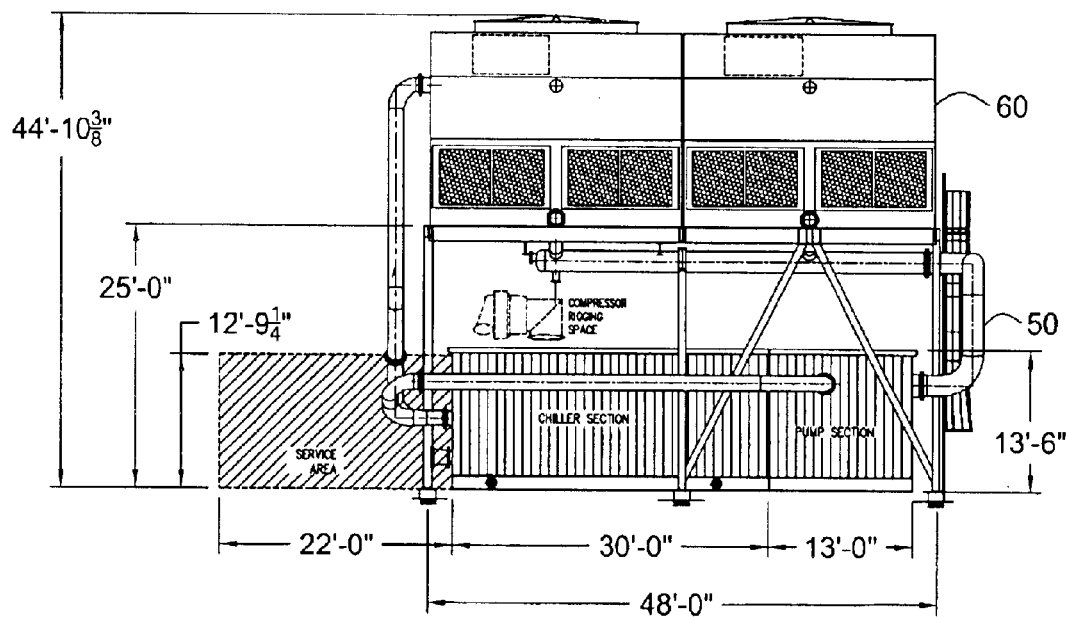

Certain embodiments are directed to a relatively small system, which may have a water chilling system that has all of its components positioned on and affixed to a single common base, or within a single enclosure, and that entire water chilling system may be considered to represent a single "module." However, in other embodiments, a larger system preferably has two or even more separate modules on separate bases, each of which can be shipped and installed separately at the location, next to the building, then bolted together or otherwise affixed or operably connected after placement at the location, before operation is initiated. In certain embodiments, an air conditioning system may include a separate chiller module or multiple chiller modules, a pump module, an electrical/control module and an optional heating module, in which case those modules could be considered "sub-modules" which can be assembled at the jobsite to form a complete system. In another embodiment, several similar or identical modules may be installed near each other and connected together with a prefabricated piping package to form a single larger capacity chilling system (as shown in FIG. 2). A cooling tower may be an integral part of the package, or a separate part. Preferably, a cooling tower is prefabricated, then shipped to the installation location, along with a prefabricated support structure and piping that allows the cooling tower to be easily mounted above the chiller and/or pumps with a simple bolt-together kit or the piping and/or cooling tower can be installed on the package before shipment. Such an arrangement may serve to minimize the footprint of the water chilling system and make the design and layout more consistent and therefore predictable. Also, preferably the cooling tower support structure will be pre-engineered to allow it to also be used as a lifting support allowing for chiller maintenance, such as for compressor removal (FIG. 5B). Also, the condenser water piping and cooling tower fan and heater electrical wiring can be minimized if they are tied into the water chilling package.

An optional air-cooled condenser or evaporative condenser may also be provided to provide for heat rejection to the immediately adjacent environment rather than to water that is transported to a cooling tower. As such, less total water would be required. Such a system preferably includes a screw or centrifugal compressor mounted on the same base on which the water chiller(s) are mounted. The air-cooled or evaporative condenser is preferably located either adjacent to or above the refrigeration unit and connected with a factory pre-fabricated piping package.

One of the design goals for this chiller plant package would be to optimize the system for the lowest life-cycle cost and highest Net Present Value (NPV). The creation of a factory built chilled water plant which is low first cost, highly efficient, quick to market, and movable from site to site allows it to be better utilized as a means of producing and selling chilled water as a utility in a highly competitive deregulated environment. This plant may preferably be offered in the market as a Build, Own, Operate (B.O.O.) concept or a tolling agreement or a lease option or it may alternatively be offered with some other type of creative financing package. This will allow the long term life-cycle cost benefits of high energy efficiency and lower maintenance to be more effectively quantified and captured.

B. Air Conditioning System

The specific embodiment of an air conditioning system shown in FIG. 1 includes a duct system 14 associated with a building system 12 (two buildings), an air handling system 16 that includes four separate air handling units (16a, 16b, 16c, 16d) and a water chilling system 18 that includes components located on a moveable support structure. In FIG. 1, the moveable support structure includes three different support bases (20a, 20b, 20c).

In FIG. 2, a perspective view of an air conditioning or process cooling system is shown, which includes a water chilling system located on a moveable support structure and an overhead cooling tower. The air conditioning system in FIG. 2 has certain similarities to that shown in FIG. 1, and like parts (which may be different at a detailed level) will have like reference numbers.

C. Air Handling System

Figure 3:
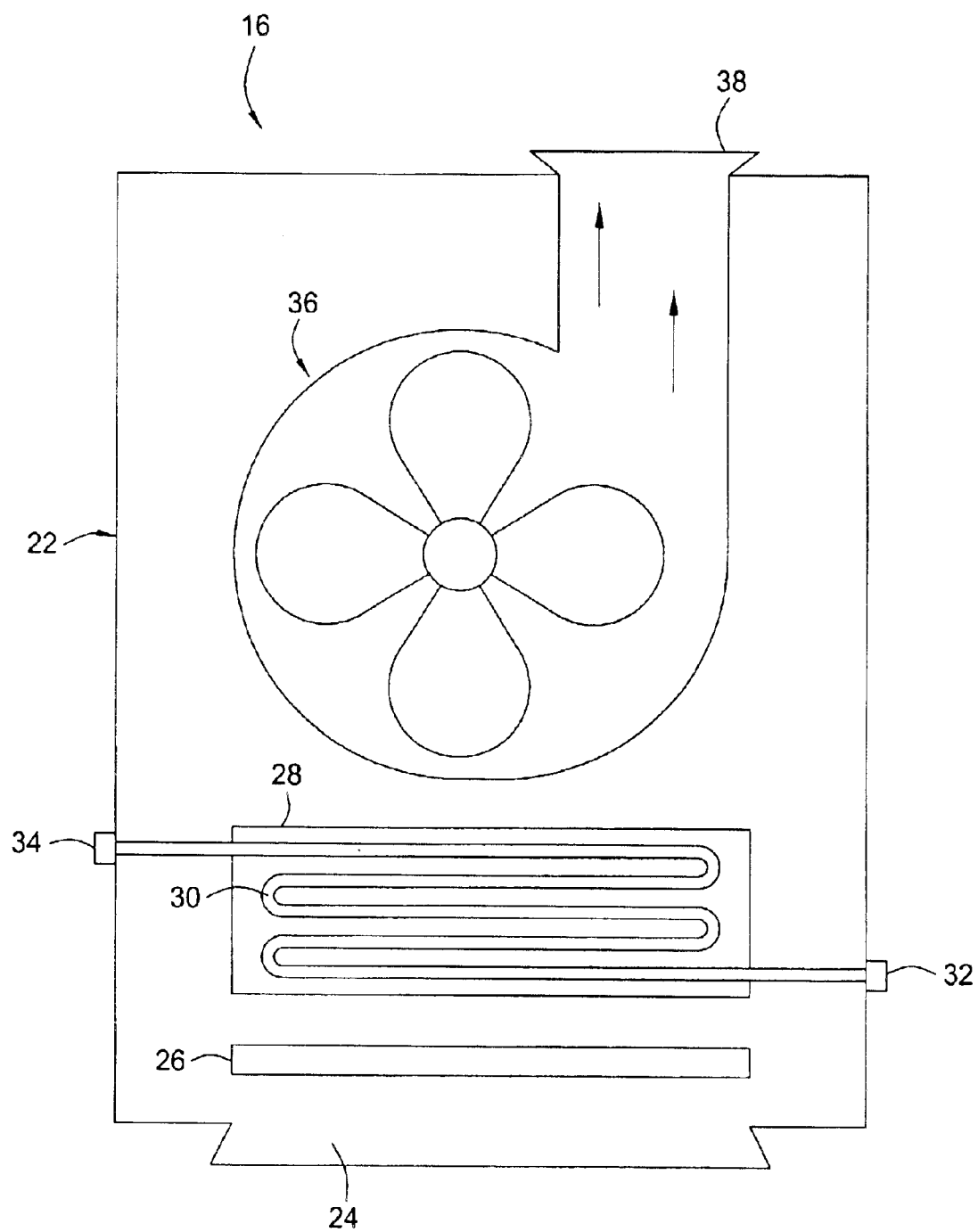
FIG. 3 is a diagram showing the different parts of a specific embodiment of an air handling system.

The air handling system that is part of one of more specific embodiments of the air conditioning systems described herein can be, in at least one specific embodiment, any conventional air handling system or fan-coil unit. A preferred embodiment is shown in FIG. 3, which is one of the single units in FIG. 1, identified simply as "unit 16" in FIG. 3. The unit (which forms either part or all of the air handling system) includes (a) an enclosure housing 22; (b) an air inlet (intake) opening 24 that is preferably part of at least one side of the enclosed housing, the air intake opening preferably receiving high temperature air from the ducts that lead from the building rooms (e.g., circulating air that is desired to be cooled), as seen in FIG. 1; (c) an air filter 26 through which the incoming high temperature air flows, which removes contaminants, e.g., dust particles, from the incoming air; (d) a cooling coil assembly (described below) 28, which preferably includes a multiple-pass cooling coil 30 that includes a conduit, a water inlet 32 through which the chilled water enters the cooling coil conduit and a water outlet 34 through which the chilled water exits the cooling coil conduit; and (e) a fan 36 for moving the air from the cooling coil assembly towards the duct system. In certain embodiments, an air outlet 38 is provided, through which the cooled air passes from the cooling coil assembly 28 (where it has been lowered from a high temperature to a low temperature) generally toward the duct system. The air outlet 38 can in alternate embodiments be part of the housing 22, or part of the duct system, or a separate component.

The fan 36 is generally configured to circulate, pull, push, direct, propel, or move the air across the outer surfaces of the cooling coil conduit 30. For example, the fan 36 can propel the supply air through the supply duct 24 to ultimately cool the various rooms, e.g., those forming part of the building system.

It should be understood that although a single cooling coil and fan are shown in each of the air handling units in FIG. 1, multiple cooling coils and fans may be provided in each individual air handling unit. Each air-handling unit may further include a heating coil (not shown) to receive heating fluids configured to heat the air passing through the air handling units or there may be electric heating elements provided.

Referring still to FIG. 3, the temperature of the water passing through the cooling coil conduit 30 should be sufficiently low to lower the temperature of the air passing through the air handling unit(s) 22, e.g., from a high air temperature that ranges from 100° F. to 50° F., or from 80° F. to 60° F., or from 78° F. to 65° F.; to a low temperature that ranges from 40° F. to 70° F., or from 45° F. to 60° F., or from 50° F. to 60° F. That is, the change in air temperature due to passing over the cooling coil 30 can have a "delta" that ranges from 60° F. to 0° F., or from 35° F. to 0° F., or from 28° F. to 5° F. The cooled air then passes (directly or indirectly) through a duct system, e.g., as described below.

D. Duct System

The specific embodiment of an air conditioning system shown in FIG. 1 includes a duct system 14, which includes a "duct," defined broadly herein in its broadest sense, as including any structure or collection of structures capable of directing air from one location to another location. The duct system preferably includes insulation (not shown), e.g., one or more layers of insulation, of a type and thickness sufficient to prevent heating of the air traveling through the duct system, particularly the "supply duct" (discussed below) that carries the low temperature air to the rooms. In at least one specific embodiment, a "duct" can be a longitudinal hollow housing typically constructed of sheet metal that either itself extends throughout a building, or is made up of a number of duct sections (each of which can be referred to as "ducts") placed end-to-end with one another. This duct network is normally located above the ceiling of the building but may also be located beneath the floor or outside the building or elsewhere.

The duct system preferably includes one or more "supply ducts" 40, each of which, generally speaking, contains air flowing away from the cooling coil. Some of the supply ducts directly supply cool air to individual rooms of the building. The duct system also preferably includes one or more "return ducts" 42, each of which, generally speaking, contains air flowing toward the cooling coil (although in a large building system, where the duct system is maze-like, the supply and return ducts may not direct air in a straight line away from or toward the cooling coils). In preferred embodiments, the supply ducts contain air that is moving, and has a low temperature, while the return ducts contain moving air that has a high temperature. The "low" and "high" temperatures may be the temperatures described above, but, at a minimum, those temperatures are relative to one another, so that the "high temperature air" is higher than the "low temperature air."

In at least one embodiment, the duct system 14 also includes individual room vents 44, e.g., diffusers, through which the cooled air (e.g., low temperature air) is preferably supplied to the various rooms throughout the large building system, so that the average temperature of the air in the various rooms is lowered as the cooled air mixes with the room air, i.e., the air already in the room.

E. Temperature Sensors

An air conditioning system described herein preferably includes air temperature sensors 46, as shown in FIG. 1. An air temperature sensor may be located in each room 48, or at least in one or more rooms of the building. An air temperature sensor may optionally be located in the supply air duct 40 to monitor the supply air temperature. Each temperature sensor may be in operable communication with one or more air or water flow controllers (not shown). Accordingly, based on the sensed temperature (of the room air or supply air), the flow controller may be activated to direct either more water or less water to pass through particular cooling coils. That is, the water flow can be increased to provide increased cooling of the air, and the water flow can conversely be decreased to provide decreased cooling of the air. Alternatively, the air flow can be increased to provide increased cooling in the room, and the air flow can conversely be decreased to provide decreased cooling in the room. While discussed herein in terms of cooling of air or room, it should be recognized to one skilled in the art that the systems described herein can also be used for heating the air in a large building system.

F. Water Chilling System

Figure 4:
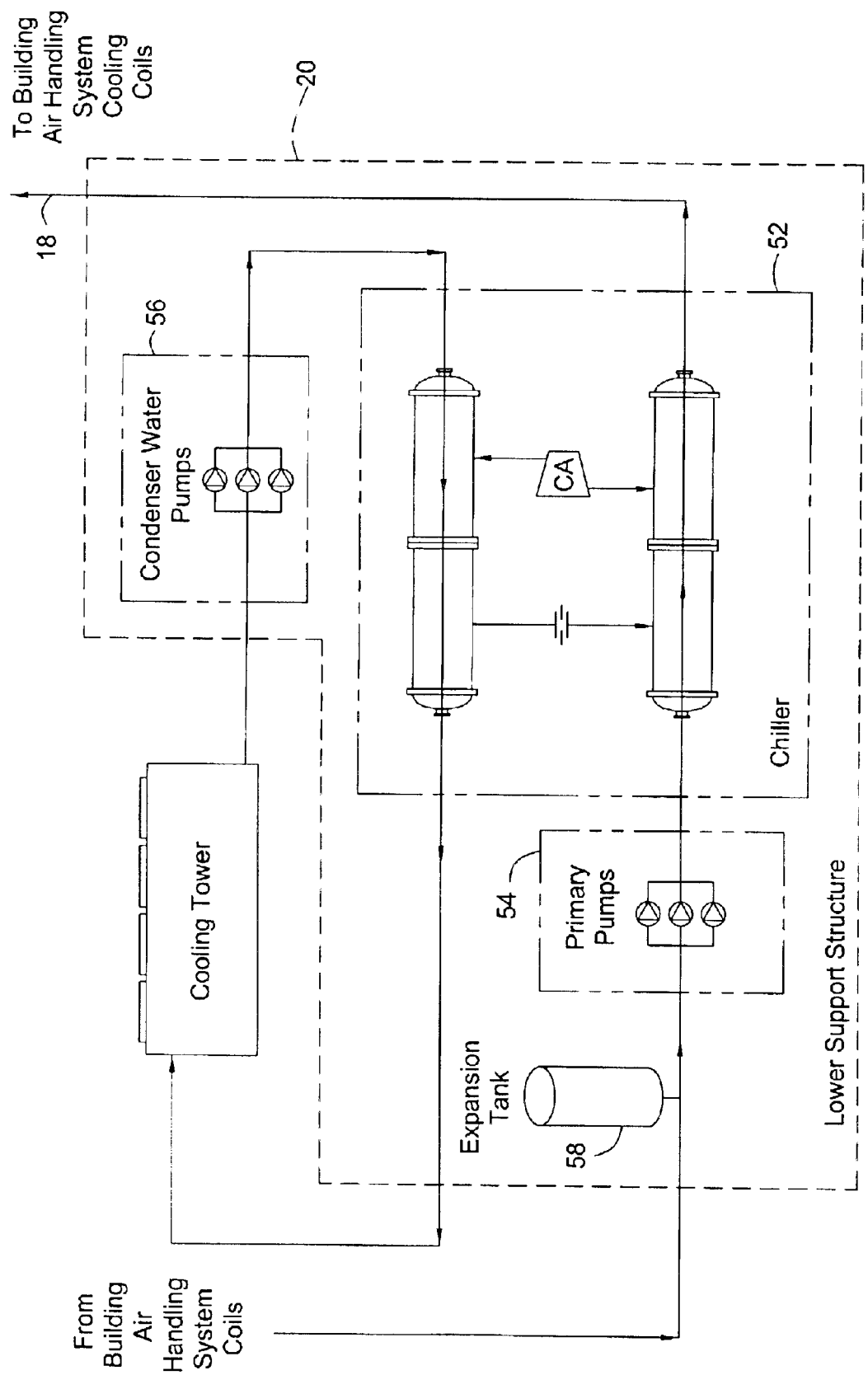
FIG. 4 is a diagram showing different parts of a specific embodiment of a water chilling system.

The specific embodiment of a water chilling system located on a moveable support structure in FIG. 4 includes a number of different components.

Preferably, water passes from each of the air-handling units to the water chilling system, which preferably includes a moveable structure 20 or structures on which is mounted all key mechanical and electrical components required to provide circulating water, which is preferably chilled water, but can also be hot water or steam, to the various air handling systems to provide cooling or heating to the large building system.

The movable support structure 20 preferably has sides and a bottom (not shown), and is configured to support the components described in further detail below. The dimensions of the movable substructure 20 are generally a function of the size and number of components attached thereto. Advantageously, as described above, a modular system can be provided, which includes one of a selection of either standard-sized support structures, or differently-sized support structures. An example of the dimensions for a specific embodiment of the chilling system substructure is shown in FIG. 5 which shows the various sections which are preferably shipped individually and then bolted together in a location proximate the building to provide a complete chilling system.

An example of a support structure 20 includes a flat steel member, which may be stationary, but may also be mounted on wheels, rollers, or similar devices (not shown) operably connected to the bottom or sides of the movable substructure for ease of transportation from the manufacturing site to the installation site. The movable substructure may further include external connections (not shown), such as lifting brackets to facilitate the moving and loading of the modular chilled water plant and chilled water supply and return connections for tie-in to the field piping which would transport the circulating chilled water from the modular chilling system to the building air-handling unit. Alternatively this modular chilled water plant can also be used to provide circulating chilled water for use on industrial and petrochemical processes such as polyethylene and polypropylene production, internet load centers, computers, manufacturing facilities such as microprocessor manufacturing, paper mills, automotive manufacturing, textiles and factory air conditioning.

The components that can be placed on a moveable support structure 20 can include one or more water chillers 52, which can be a centrifugal water chiller, a screw water chiller, or an absorption water chiller. As used herein, the term "water chiller" refers to any apparatus that includes and least one conduit through which water flows that is capable of lowering the temperature of water passing through the apparatus or conduit. The water chiller 52 may be a mechanical chiller, which may include a centrifugal or screw or reciprocating or rotary compressor, and which may further include an associated driver, such as an electric motor, a steam turbine, a gas turbine, turboexpander, or an engine. The water chiller 52 may be or include any number of conventional water chillers installed either in parallel or in series, but for larger systems which require more than one chiller it is preferable to have at least two chillers piped in series so as to stage the temperature drop of the circulating water into an intermediate and a lower temperature chiller, thereby saving power on the upstream/intermediate chiller and making the modular chilling water plant more efficient than when the water chillers are not piped in series. When the circulating water 18 is chilled to a sufficiently low temperature to cool the return air to a predetermined temperature, e.g., via sequential chilling, the air passing through the air-handling unit, herein referred to as return air, can be cooled with a minimum circulating water flowrate and a maximum circulating water $\Delta T$. As used herein, "circulating water $\Delta T$" refers to the temperature difference of the circulating water 18 between the circulating water inlet and the circulating water outlet of the cooling coil in the air-handling unit.

The components can further include chilled water circulating pumps 54, condenser water circulating pumps 56, suction strainers, expansion tanks 58, isolation valves, motor starters for the water chillers and pumps, control systems, fire protection equipment, gas detection and ventilation and other equipment that may be required by a local code.

The components can be mounted on the movable substructure and can be enclosed by a housing (as shown in FIGS. 2A&B and FIG. 5) to provide weather protection for the components. The housing can include doors located as necessary to allow operating and maintenance personnel access to the components as necessary. As used herein, the term "housing" refers to any enclosure, which may include a contiguous structure having sides and a top, or multiple pieces, which are operably connected. In addition, the housing may be configured to be removable to provide further access for major maintenance requirements. The housing may be attached to the base at the assembly site or at the installation site.

The components are preferably piped together via conventional piping, such as by polyvinylchloride (PVC) or steel pipes having valves (not shown) where appropriate.

Each water chiller should include at least one conduit, e.g., a piping or other tubular arrangement, through which the circulating water is capable of passing.

Figure 6:
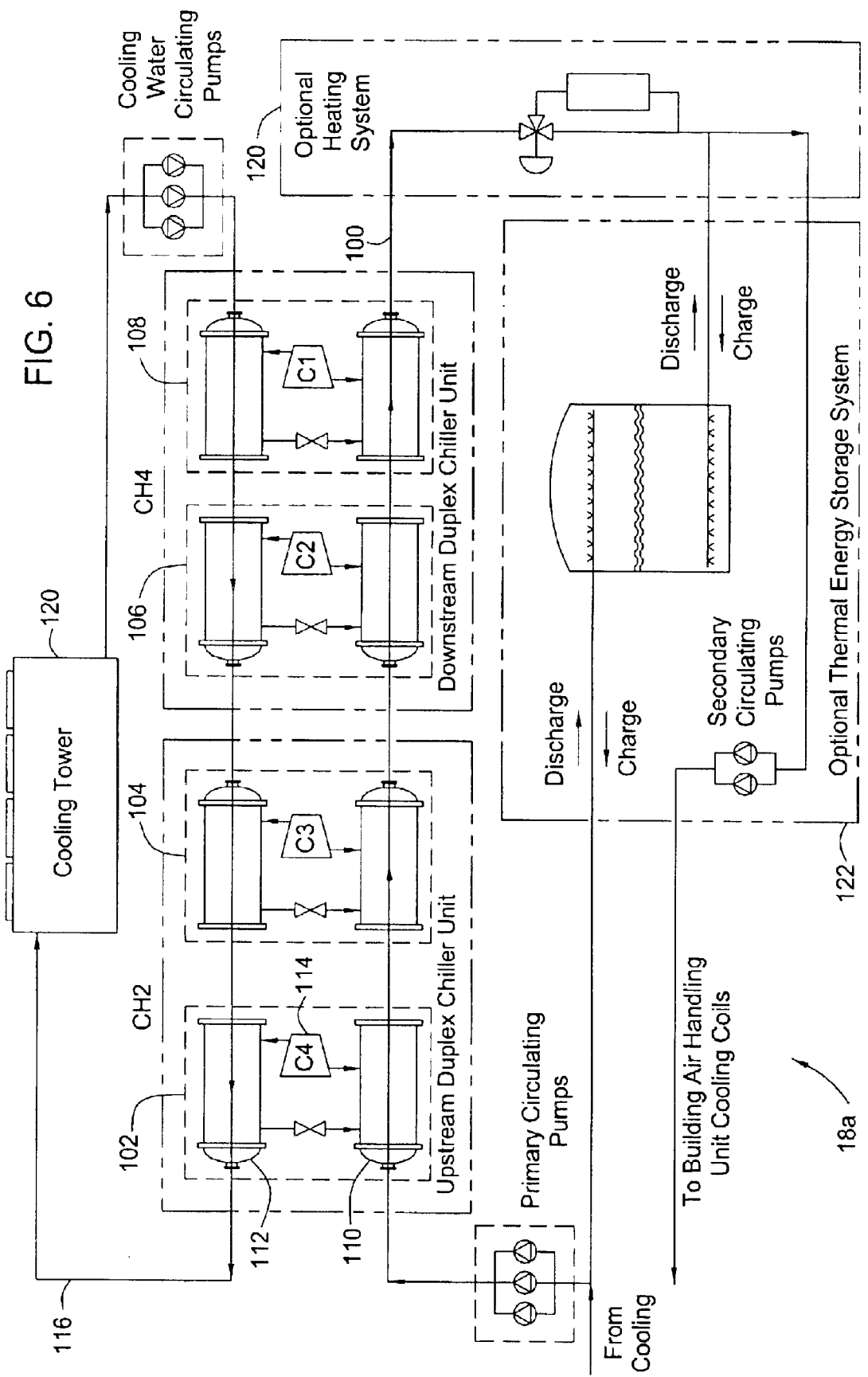
FIG. 6 is a diagram showing different parts of a specific embodiment of a two duplex water chilling system for building air-conditioning with modular chilling and pumping and heating systems combined with an optional Thermal Energy Storage (TES) system.
Figure 7:
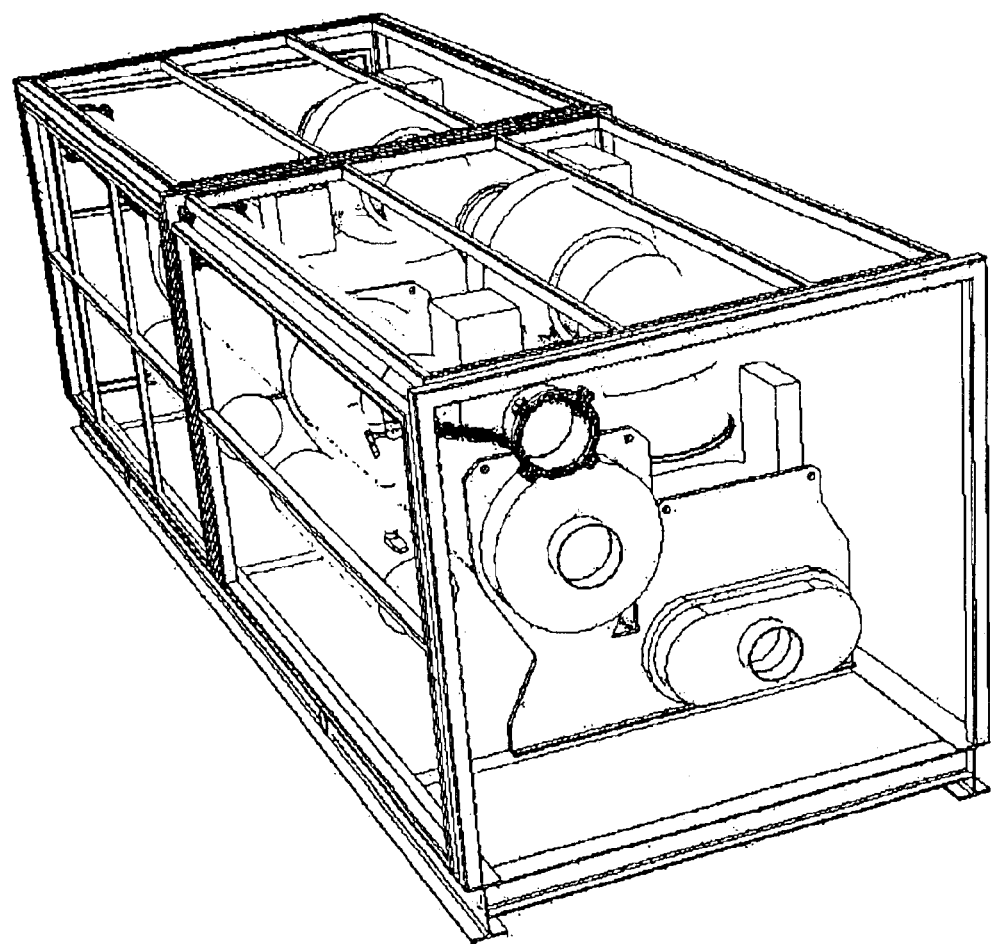
FIGS. 7–9 show a detailed view of different parts of a specific embodiment of a chilling system.
Figure 8:
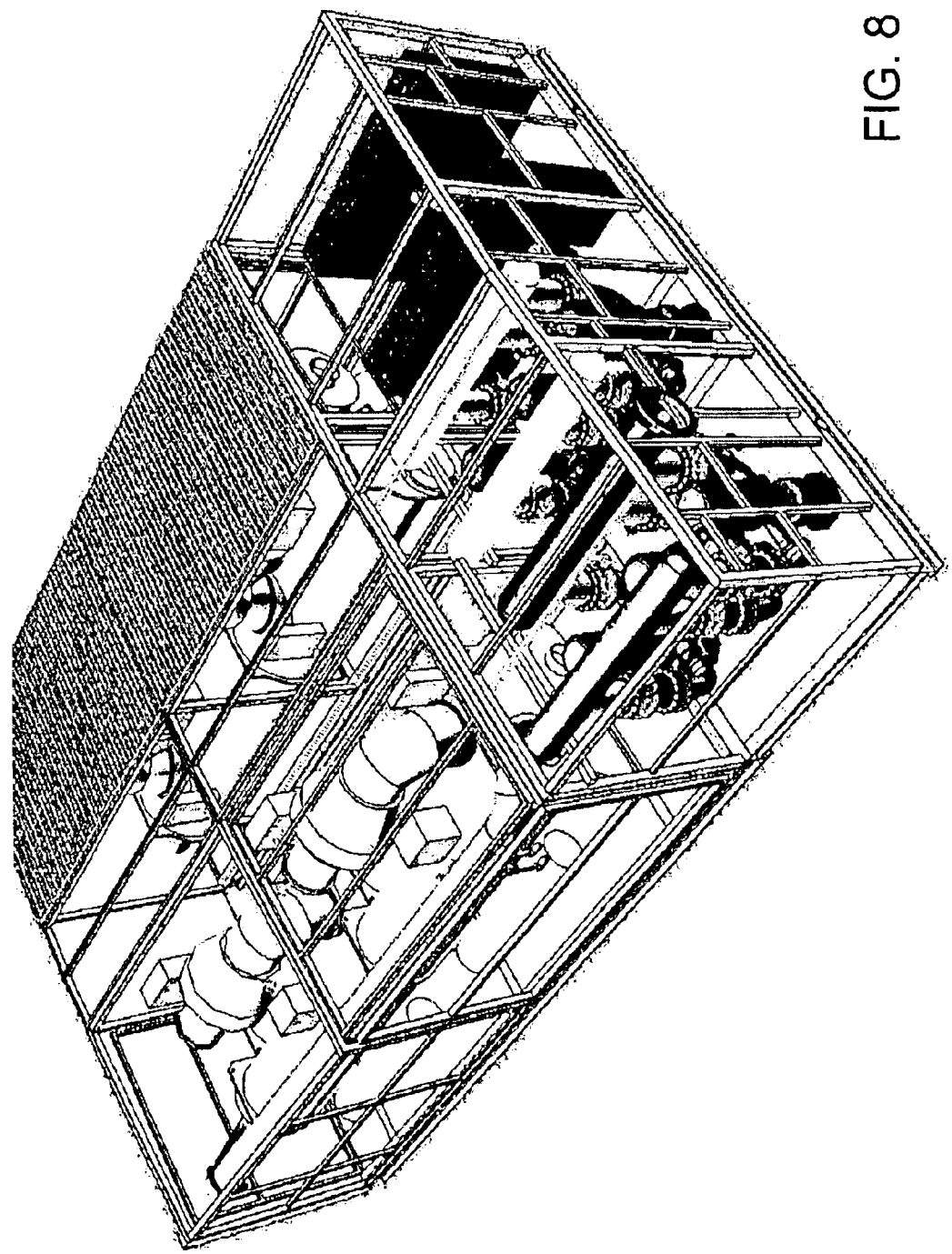
Figure 9:
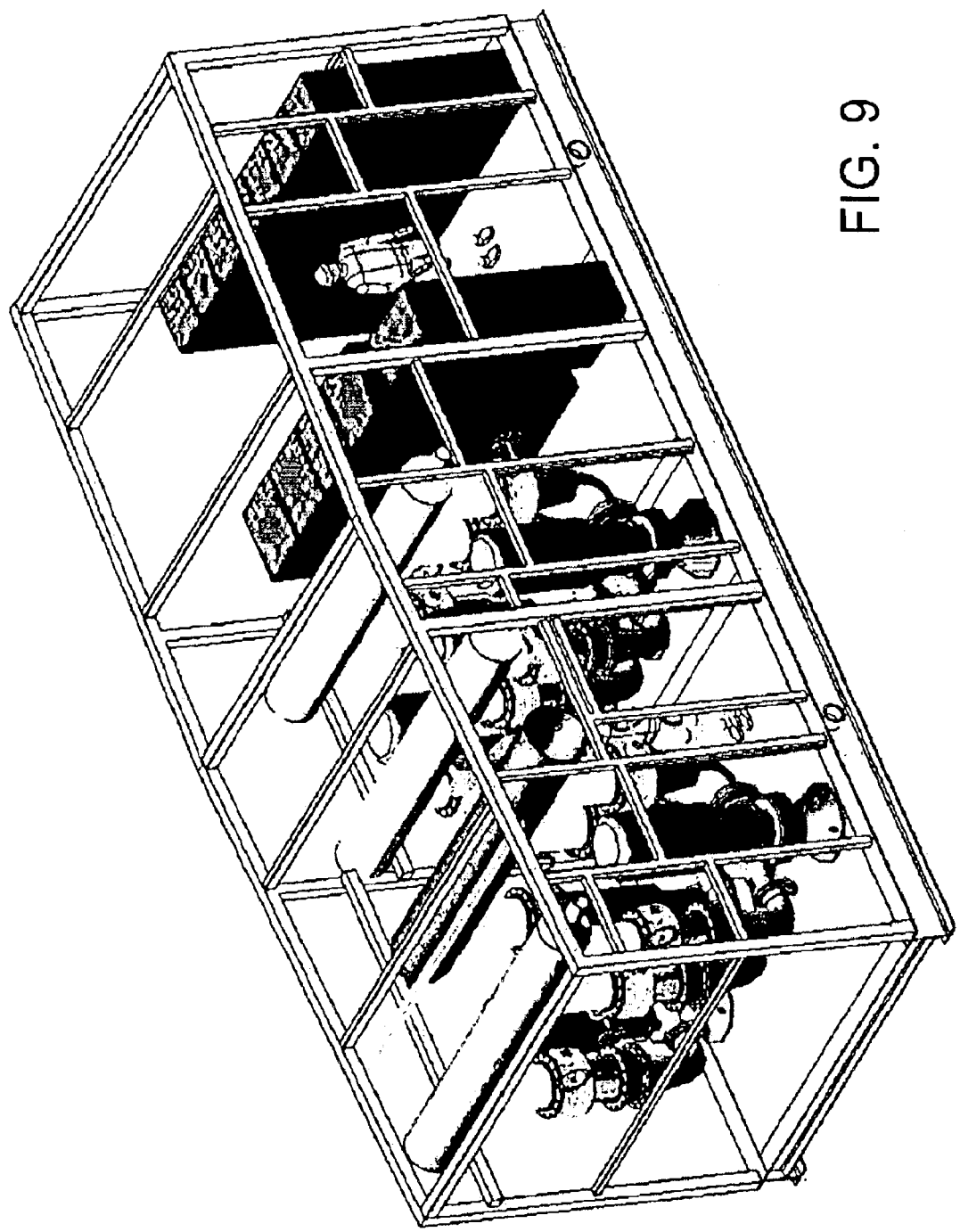

In a preferred embodiment, the circulating water is passed sequentially through two or more water chillers. FIG. 6 illustrates an example of components of a modular chilled water plant. In operation, that modular chilled water plant includes passing circulating water 100 from an air-handling unit (not shown) to a first water chiller, then to a second water chiller (or a single duplex chiller as shown), then through an optional third chiller and fourth chiller (or a second duplex chiller as shown in FIG. 6), and then back to the air-handling unit. Preferably each of the water chillers would include at least one opening for receiving the circulating water, and at least one outlet for dispensing the circulating water. A conduit through which the circulating water is capable of passing should operably connect the one opening for receiving circulating water with the one outlet for dispensing circulating water. Preferably, the circulating water passes through at least two water chillers, which can form part of a single "duplex chiller," although it could alternatively consist of two simplex chillers with the evaporators of the water chillers piped in series. Preferably, at least a portion of the circulating water is passed from and through the first water chiller to and through the second water chiller. More preferably, all, or substantially all, of the circulating water is passed from and through the first water chiller to the second water chiller.

Passing the circulating water through a water chiller, e.g., a conventional mechanical or absorption chiller, reduces the circulating water temperature. When the circulating water is sequentially passed through two water chillers whose evaporators are piped in series (or through a single duplex chiller), the circulating water temperature is reduced twice. Preferably, in carrying out certain methods of the invention, the sequential circulating water temperature reductions are accomplished by passing the circulating water through a duplex mechanical chiller such as the Trane duplex centrifugal CDHF water chiller. As shown in FIG. 6, staged or step-wise circulating water temperature reductions can be accomplished by passing circulating water through an evaporator 110 within the duplex mechanical chiller CH2. The evaporator chills the circulating water by receiving a refrigerant such as ammonia, R-22, R-134a, or R-123 available from Dupont. Preferably, R-123 or a similar refrigerant is passed from a condenser 112 to the evaporator 110 to chill the incoming circulating water. The refrigerant is then passed from the evaporator 110 back through a compressor 114 to the condenser 112 for condensing the vaporized refrigerant back to a liquid. The refrigerant is cooled and condensed by condenser water 116 passed from a cooling tower 120 to the condenser 112 (typical of each chiller).

A specific embodiment of the invention includes passing circulating water through a duplex chiller CH2 to reduce its temperature from a first temperature to a second temperature lower than the first, then to a third temperature lower than the second. The circulating water can then be passed through another duplex chiller CH4 to further reduce the water temperature twice (as shown in FIG. 6). Any number of water chillers may be included to reduce the temperature of circulating water for large building systems. Any number of sequential steps may be used, although two duplex chillers in series (4 stages of cooling) is considered optimal. For larger building systems that would require more capacity than can be accomplished with 2 duplex chillers, additional pairs of duplex chillers can be provided that divide the total flow of water into the parallel trains of chillers (as shown in FIG. 1 and FIG. 2).

The discussion of the embodiments has focused primarily on the modular nature of the chiller system construction and, for larger systems which may require more than one chiller, on the sequential chilling of the chilled water by using progressively colder evaporator refrigerant temperatures. However, there is also increased efficiency available by utilizing sequential heat rejection from the refrigerant to the condenser water 116 through the use of two or more condensers 112 in series. It is preferred that the condenser water 116 be piped in a counterflow arrangement to that of the circulating water 100, i.e., the coldest condenser water is adjacent to the coldest circulating water (as shown in FIG. 6).

Sequential chilling of the circulating water 100 in the evaporator 110, which results in sequential vaporization of the refrigerant, can be combined with sequential heating of the condenser water 116, which results in sequential condensing of the refrigerant, thereby equalizing the head on each compressor, e.g., by passing all, substantially all, or at least a portion, of circulating water 100 from a first water chiller 112 to a second water 104. Equalizing the head on each compressor 114 can increase the compressor efficiency, shown in greater detail below. As used herein, the term "head" refers to the compressor pressure ratio, which is the pressure of the condenser 112 divided by the pressure of the corresponding evaporator 110. For example, referring to FIG. 6, the upstream compressor head is equal to the pressure of the upstream condenser 112 divided by the pressure of the corresponding evaporator 110.

In a preferred embodiment of the invention, the circulating water 100 is passed from a cooling coil located at the air handling unit in the building through two duplex chillers (CH 2 & CH 4) located in a prepackaged chiller system located proximate to the building. The circulating water passing through the duplex chillers is sequentially reduced from a high temperature resulting from a high water ΔT through the air handling system (from about 50° F. to about 65° F.) to a final temperature of from about 36° F. to about 42° F.

One benefit of sequentially chilling the circulating water is that only the downstream compressor in the chiller 108 needs to compress the refrigerant to a low enough pressure to chill the circulating water 100 to the lower leaving chilled water temperature which is required with a lower circulating water flowrate.

When the circulating water flowrate is reduced, the power consumption of the downstream compressor may increase. The compressor power consumption increases as a result of chilling the refrigerant to a lower temperature due to the lower leaving water temperature than that required at a high circulating water flowrate. The circulating water entering the downstream evaporator is at a higher temperature than when circulating water is at full flow because the air-handling unit will heat up the circulating water more at lower flow. Therefore, at a reduced flowrate, the downstream refrigerant must be at a lower temperature to maintain the required LMTD and heat transfer required at the air handling unit cooling coil.

G. Cooling Tower or Heat Rejection Condenser

In certain embodiments, the cooling tower is positioned on the ground, while in others it is positioned on one of the buildings that are being cooled, or even on an adjoining parking garage. However, in a preferred embodiment, a cooling tower is positioned above the water chilling system, e.g., supported by an elevated support base, as shown in FIG. 2.

A cooling tower is used to reject (i.e., expel) heat from the system, e.g., the heat contained in the high temperature water, which in turn comes from the high temperature air returning from the building. Referring to FIG. 2A, one or more cooling water pumps propels water from the cooling tower through the chiller, e.g., through condenser tubes in the chiller, then back to the cooling tower. The water circulating between the cooling tower and the water chilling system is usually different from the water that circulates between the water chilling system and the air handling system.

Preferably, the cooling tower is prefabricated, e.g., constructed prior to installation at the location proximate the building. Preferably, when installed at the building location, the cooling tower is positioned above the water chilling system.

When no water is available for use in a water-cooled condenser or at sites that have water restrictions, an air-cooled condenser may be used. An air-cooled condenser transfers the heat from the refrigerant to the ambient air. An air-cooled condenser can be placed in a number of locations, but is preferably mounted either on, or alongside, the moveable substructure. An air-cooled condenser may be used with a screw or centrifugal compressor mounted on a base that has refrigerant piping to the air cooled condenser. An air-cooled condenser typically cannot be used to sequentially reject heat to the ambient like that of series piped water-cooled condensers, but it still can provide an increase in the upstream compressor efficiency as a result of sequentially chilling the circulating chilled water using staged evaporators to allow sequentially lower refrigerant temperatures with the different compressors. In a preferred embodiment, sequential chilling of the circulating water is combined with a chilled water thermal storage tank as discussed elsewhere herein. This is especially beneficial when no water is available due to the great variability in the dry bulb temperature between daytime and nighttime. The lower nighttime drybulb temperature preferably substantially increases the capacity and also the efficiency of the chillers to generate chilled water off-peak and minimize the daytime on-peak parasitic power required.

H. Heating System

In another embodiment of the invention, circulating water is passed from an air-handling system to a heating system 120 (as shown in FIG. 6), which is preferably mounted on the moveable substructure, and the circulating water 100 is then directed back to the air handling system. For example, circulating water 100 can be passed to the heating system 120 on cold days. The circulating water 100 can be heated to provide heat that may be required at the load. Although any conventional heater may be used, examples of heaters are gas-fired or electric water heaters, or steam to hot water exchangers.

I. Circulating Water Additives

Any of the methods described herein may include adding one or more additives to the circulating water to either protect the circulating water from freezing or to allow colder circulating water supply temperatures (e.g., from about 28° F. to about 35° F.). Any additive may be added, including glycol. Preferably, an organic or inorganic salt is added. More preferably, sodium nitrate is added to prevent the detrimental effects of glycol on the heat transfer properties and viscosity of water, which tend to increase the power requirements for pumping and for the chiller compressor. In addition, sodium nitrate is not corrosive like other salts. Sodium nitrate is generally a preferred additive if a chilled water thermal storage tank is used due to its low cost. However for on-line systems where no thermal storage tank is used, the most preferable additive is typically potassium formate. The ability of potassium formate to protect the coil and piping from freezing during winter ambient temperatures, combined with its excellent heat transfer properties and low viscosity at low temperatures makes potassium formate an ideal additive for closed loop chilled water systems in large building systems where freezing is a concern either due to low ambient temperatures to which the coil or piping may be exposed or due to low desired leaving water temperatures from the chiller which might result in a freezing concern if pure water is used.

J. Variable Flow

An air conditioning system may, in certain embodiments, include a control system, such as a microprocessor-based control system or a PLC-based control system. The control system should respond to temperature sensors, e.g., air temperature sensors in the individual rooms or air temperature sensors proximate to or otherwise adjacent with the air handling system. Preferably, a control system may be included that control the flowrate of the circulating water. In order to vary the temperature at each individual air handling unit, the flow rate of the circulating water passing through the cooling coil of the air handling units, e.g., the volume of water passing through the cooling coil conduits per unit time, e.g., hour, can be varied.

As an example, circulating water may be passed through one or more water chillers (which are preferably sequentially positioned) at a first flowrate to reduce the temperature of the circulating water, e.g., from a first temperature to a second temperature. In a preferred embodiment, the flowrate of the circulating water passing through the water chiller may be reduced, e.g. to a second flowrate, during lower ambient, e.g., at night-time to save energy in pumping power.

A preferred embodiment may also include passing circulating water through one or more water chillers (preferably the same water chillers corresponding to the first flowrate) at a different or "reduced" or "second" flowrate, in such a way and in an amount to increase the temperature difference ($\Delta T$) between the circulating water entering the air handling unit and the circulating water leaving the air handling unit. The second flowrate should be lower than the first flowrate. Accordingly, different predetermined flowrates for water passing through two or more chillers can be used. Then, the embodiment should also include passing the circulating water having the second flowrate (or the reduced or different flowrate) through the air-handling unit in an amount sufficient to lower the temperature of the inlet air. Preferably the circulating water having the first (e.g., higher) flowrate should be reduced to the second (lower flow rate) once the water $\Delta T$ (e.g., a temperature reduction by two or more sequentially positioned water chillers) is reduced to a predetermined point due to a reduction in ambient load.

An important aspect of certain embodiments of the invention includes reducing the flowrate of circulating water in a particular way. All references to "flowrate" herein refer to the rate of circulating water passing through a particular portion in the system, e.g., the pump (e.g., in gpm), divided by a given amount of refrigeration duty (e.g., in tons). Preferably, optimizing the proper gpm/ton is an important design criteria. It is desirable to vary the circulating water flowrate to maintain a relatively low gpm/ton of from about 1.5 to about 3.0 gpm/ton at full load throughout the operating ambient range. The optimum design for on-line cooling systems will be from about 2.0 gpm/ton to about 3.0 gpm/ton. The optimum design for thermal storage systems will preferably be from 1.5 to 2.5 gpm/ton at full load. In addition it is desirable to vary the circulating water flowrate to maintain a relatively low gpm/ton of approximately 1.0 to 3 gpm/ton throughout the part-load operating ambient range or more preferably to maintain a flow of approx 1.5 to 2.5 gpm/ton. Since the pump power varies by the cube of the flow, this low-flow design will save significant pump power during the part load operation and it will also maintain a relatively warm return water temperature thus maintaining a high efficiency on the upstream compressors. The benefits of using a lower chilled water flow and corresponding high chilled water delta T are even greater in large district cooling and campus installations whereby the chilled water travels through many feet of pipe before it returns back to the chiller system. These systems can consume large amounts of pump power if the chilled water delta T is not maintained properly. More specifically, one or more embodiments of the invention include reducing the flowrate of circulating water passing through two or more sequentially positioned water chillers, preferably two duplex chillers (which provide four different temperature reductions), and passing the circulating water having the resulting reduced flowrate through a cooling coil in an air handling unit in an amount sufficient to lower the temperature of the air passing through an air handling unit. In other specific embodiments, a method of chilling inlet air includes passing circulating water, having a first temperature, through a pump, e.g., at a first flowrate, then passing that same water through a water chiller that reduces that circulating water temperature (e.g., using a first compression) so that the circulating water has a second temperature, which is lower than the first water temperature, and then passing that water through a second water chiller to reduce the circulating water temperature from a second temperature to a third temperature (e.g., using a second compression) that is lower than the second.

High system efficiency can be achieved in certain systems by maintaining a high circulating water ΔT, rather than providing for a high circulating water flowrate. Preferably, achieving a high system efficiency at a low circulating water flowrate (e.g., about 1.5–2.5 gpm/ton) depends, in part, on reducing the temperature of the circulating water at least two times before it chills the air passing through the air handling unit, i.e., sequential chilling. A preferred embodiment of the method includes using at least two water chillers to sequentially chill the circulating water.

In certain embodiments, the circulating water flowrate is reduced to maintain the chilled water ΔT within a specific design range. This ΔT should be maintained within a range of about 24° F. to 12° F. to maintain maximum efficiency with a sequential chilling system with the higher end of this range being better for thermal storage applications & high ambient climates with high row multi-pass cooling coils. The middle and lower end of this range is better for typical on-line applications or existing air-handling coils which were not designed for low-flow application. In another specific embodiment, the leaving chilled water temperature setpoint and the circulating water flowrate setpoint may be changed to maintain the leaving air temperature and the chilled water ΔT within the design parameters. As used herein, the term "setpoint" refers to any predetermined point or event that results in the flowrate through the chillers and the coil being changed, or a change in the temperature of the water leaving the chiller.

In one or more specific embodiments of the invention, the circulating water is passed through at least one pump to vary the flowrate of the circulating water before it is subjected to sequential chilling, e.g., using two in-series chillers as shown in FIG. 6. Alternatively or additionally, the circulating water may be passed through any number of pumps. Preferably the pumps are generally mounted in parallel to allow the flow to be changed by sequencing a combination of pumps on and off. Preferably, at least a portion of the circulating water is passed through one centrifugal pump, e.g., a horizontal split case pump, and a different portion of circulating water is diverted and passed through at least one additional pump the output streams of the two or more pumps then being combined. More preferably, the circulating water is split, then passed through two or more centrifugal pumps in parallel, then combined. Optionally, one or more of the pump motors may be wired to a variable frequency drive (VFD) for greater flexibility in flow control and greater partial load efficiency. The circulating water may be passed through a pump anywhere in the system. Preferably, the circulating water is passed through at least one pump, referred to as a primary pump, located in the piping that circulates the circulating water through the chillers. Although the circulating water flowrate is preferably varied only at the primary pump, the circulating water may additionally or alternatively be passed through other pumps at any location in the system. When circulating water is passed through those other pumps, those pumps are typically not used to reduce the circulating water flowrate through the water chillers, but rather are used for another purpose, such as to pass water from a bank of chillers to the air handling units or as a booster pump for a remote load, or when a Thermal Storage System is employed (as shown in FIG. 6, Secondary Circulating Pumps).

In a preferred embodiment, the circulating water passes through at least one pump at full flow when the load and often the ambient wet bulb temperature is at a maximum, typically at some point in time between noon and 3:00 pm during the summer season. As used herein, the term "full flow" refers to the maximum circulating water flowrate of the system. In this particular embodiment, when the load drops (e.g., to a lower wet bulb period such as during the morning or late afternoon or night) the water ΔT also drops. When the chilled water ΔT reaches a first setpoint (e.g., from about 75% to about 50% of design ΔT), one of the centrifugal pumps is preferably turned off. Shutting off one of the two operating centrifugal pumps should accordingly reduce the circulating water flow rate from about 100 percent flow to about 70 percent flow, thereby increasing the water ΔT, e.g., by about 43 percent. Then, when the circulating water reaches a second setpoint (e.g., from about 75% to about 50% of design ΔT), the VFD on the first VFD pump is reduced, further reducing the circulating water flowrate enough to maintain the chilled water ΔT to at least about 10° F. the circulating water temperature may also be adjusted downward to allow the load to be satisfied with the reduced flow rate.

K. Thermal Storage Unit

Circulating water may optionally be directed to a thermal water storage tank. Preferably, the thermal water storage tank is not mounted on the moveable substructure, but is in close proximity and operably connected to the water chillers of the modular chilled water plant (shown in FIG. 6). A number of conventional devices can be used to chill the water going to the water storage tank. For example, the circulating water can be chilled before introduction to the tank, by passing the circulating water from the air-handling units either through a mechanical chiller or an absorption chiller to provide chilling water that is then introduced to the tank. The thermal water storage tank is preferably a thermally insulated vessel, having an upper opening or connection or top inlet/outlet. In other specific embodiments, e.g., where an open tank is used, the top "opening" or top inlet can be the open top of the tank, so that water can be piped into the tank through the top. The tank may be made from any material having the strength and insulation qualities necessary for a thermal water storage tank, however, preferably, the tank is constructed of steel or concrete. The top inlet/outlet (also referred to herein as an "opening") both receives heated water from the air-handling unit during a discharge cycle, and expels heated water during a charge cycle. The thermal water storage tank preferably also has a lower connection or bottom inlet/outlet (or "opening"). The bottom inlet/outlet both receives circulating water from the water chillers during the charge cycle, and discharges circulating water to the air-handling unit during the discharge cycle. Preferably, the water in the tank is "stratified" according to temperature, and is used in "charge" and "discharge" cycles. Controlling of the flow of water in and out of a thermal water storage tank is discussed in U.S. Pat. No. 6,318,065, which is hereby incorporated by reference.

What is claimed is:

1. A prefabricated chilling water system for a building, comprising:

a duct system;

an air handling system; and a water chilling system wherein;

the duct system is in operable communication with the building, the building having a plurality of rooms, the duct system comprising at least one supply duct for directing low temperature air from the air handling system to the building and at least one return duct for directing high temperature air from the building to the air handling system;

the air handling system includes a plurality of air handling units, each air handling unit comprising an air inlet for receiving high temperature air from the building, a cooling coil that includes at least one conduit through which chilling water flows, the cooling coil having multiple passes and positioned for heat transfer contact with the high temperature air, and a fan for increasing static pressure of air in the air handling unit;

the water chilling system is installed at a location proximate the building, and is operably connected to the air handling system cooling coil; and the water chilling system includes a moveable support structure comprising a support base on which a plurality of water chilling system components are affixed, the components including at least one water chiller for lowering the temperature of chilling water from a high temperature to a low temperature.

2. The prefabricate chilling water system of claim 1, further comprising a motor control center or starter which is mounted upon the support base and wherein one or more chiller motors and one or more pump motors are prewired to the motor control center such that field power wiring can be brought to a single point power connection for each voltage.

3. The prefabricated chilling water system of claim 1, further comprising an expansion tank which is operably connected to the chilling water system and mounted on the support base.

4. The prefabricated chilling water system of claim 2, further comprising a controls system, the control system being prewired to a chiller control panel and the motor control center and a chilled water flow switch which is prepiped to the one or more water chillers and wired to safety interlocks.

5. The prefabricated chilling water system of claim 1, further comprising a weatherproof enclosure or building with access doors or removable panels for maintenance or personnel access to the water chilling components.

6. The prefabricated chilling water system of claim 1 further comprising a refrigerant gas monitor which is operably connected to an alarm and an exhaust fan, both being activated when a refrigerant level reaches a predetermined setpoint as measured by the refrigerant gas monitor.

7. The prefabricated chilling water system of claim 1, wherein an annualized chilled water production cost is minimized and the chilled water is sold on a metered basis.

8. The prefabricated chilling water system of claim 1, wherein the circulating water comprises additives to reduce a freezing point of the chilling water.

9. The prefabricated chilling water system of claim 8, wherein the additive comprises sodium nitrate.

10. The prefabricated chilling water system of claim 8, wherein the additive comprises potassium formate.

11. The prefabricated chilling water system of claim 1, in which the duct system also includes a plurality of room ducts, each room duct leading to the individual rooms.

12. The prefabricated chilling water system of claim 1, in which the at least one water chiller includes a first chiller and a second chiller, the first and second chillers being arranged in series such that chilling water is capable of sequentially passing through the first and second chillers.

13. The prefabricated chilling water system of claim 1 in which the water chilling system includes two or more water chillers that are configured such that chilling water is capable of passing sequentially through each of the two or more water chillers, the chilling water being chilled to a first temperature after passing through the first water chiller, the same chilling water being chilled to a second temperature after passing through the second water chiller.

14. The prefabricated chilling water system of claim 1, in which the at least one water chiller includes a first mechanical chiller and a second mechanical chiller, the first and second mechanical chillers being arranged in series, wherein chilling water leaving the second mechanical chiller has a lower temperature than the temperature of the chilling water leaving the first mechanical chiller.

15. The prefabricated chilling water system of claim 1, wherein the at least one water chiller comprises a first water chiller and a second water chiller, the first and second water chillers being arranged in series and configured to provide a staged chilling water temperature drop of a high water temperature of from about 45° F. to about 75° F. to a lower water temperature of from about 34° F. to about 55° F.

16. The prefabricated chilling water system of claim 1, wherein the at least one water chiller comprises a first water chiller and a second water chiller, the first and second water chillers being arranged in series and configured to provide a staged chilling water temperature drop of a high water temperature of from about 48° F. to about 60° F. to a lower water temperature of from about 36° F. to about 45° F.

17. The prefabricated chilling water system of claim 1 in which the at least one water chiller includes a mechanical chiller or an absorption chiller.

18. The prefabricated chilling water system of claim 1, in which at least some of the chilling system components are pre-assembled on the moveable support structure, being affixed to the support base before the chilling water system is installed proximate the building.

19. The prefabricated chilling water system of claim 1, in which the support base comprises a frame that includes a plurality of steel I-beams on which a metal plate is affixed.

20. The prefabricated chilling water system of claim 1, in which the chilling water system further includes a housing removably affixed to the moveable substructure, the housing sized and configured to enclose the plurality of components.

21. The prefabricated chilling water system of claim 1, in which the chilling water system is assembled before it is shipped to the location proximate the building, such that the assembled chilling water system includes at least two compressors and at least two evaporators, wherein the evaporators are capable of operating at different temperatures and refrigerant pressures to achieve a sequential chilling of the chilling water passing through the evaporators.

22. The prefabricated chilling water system of claim 1, in which the chilling water system is assembled before it is installed at the location proximate the building, such that the assembled water chilling system includes at least two duplex compressor chillers having four evaporators configured to operate at different temperatures and refrigerant pressures to achieve four stages of sequential chilling of the chilled chilling water, and at least four condensers, at least one chilled water pump, at least one suction strainer, at least one expansion tank, at least one isolation valve, at least one motor starter and at least one control system.

23. The prefabricated chilling water system of claim 1, additionally comprising a chilling water temperature sensor operably connected to chilling water passing through the cooling coil, and further comprising a controller responsive to the water temperature sensor, capable of adjusting either the temperature or the flowrate of the chilling water.

24. The prefabricated chilling water system of claim 1, additionally comprising a water temperature control system operably connected to the at least one water chiller, for adjusting the temperature of the chilling water passing through the at least one water chiller.

25. The prefabricated chilling water system of claim 24, additionally comprising a prewired control system, the control system being prewired to the water temperature control system and is configured to stop and start the water chillers, the chilled water pumps and the condenser water pumps to provide a predetermined leaving chilling water temperature and flowrate.

26. The prefabricated chilling water system of claim 1, additionally comprising a chilled water thermal energy water storage tank that is operably connected to the water chiller.

27. The prefabricated chilling water system of claim 1, in which the at least two condensers comprise a first condenser and a second condenser and wherein condenser water passes through the second condenser prior to passing through the first condenser and wherein the chilling water passes through the first condenser prior to passing through the second condenser, resulting in a differential refrigerant head pressure of the second compressor which is within about 20% of a differential refrigerant head pressure of the first compressor.

28. The prefabricated chilling water system of claim 1, additionally comprising a cooling tower.

29. The prefabricated chilling water system of claim 1, additionally comprising a cooling tower affixed to the moveable support structure.

30. The prefabricated chilling water system of claim 1, additionally comprising a cooling tower, in which (a) the support base is a lower support base on which the plurality of water chilling system components are affixed; (b) the moveable support structure additionally includes an upper support base positioned above the lower support base upon which the cooling tower is mounted.

31. The prefabricated chilling water system of claim 1, in which the water chilling system is assembled before it is installed at the location proximate the building, such that the assembled water chilling system includes at least one chiller, at least one chilled water circulating pump, at least one isolation valve, at least one chiller motor starter, at least one circulation pump motor starter, at least one condenser water pump and at least one control system.

32. The prefabricated chilling water system of claim 1, in which the water chilling system is assembled before it is installed at the location proximate the building, such that the assembled water chilling system includes at least one chiller, at least one chilled water circulating pump, at least one isolation valve, at least one chiller motor starter, at least one circulating pump motor starter, at least one condenser water pump and at least one control system.

33. The prefabricated chilling water system of claim 1, in which the high temperature air has a temperature of from about 100° F. to about 50° F. and the low temperature air has a temperature of from about 40° F. to about 70° F.

34. The prefabricated chilling water system of claim 1, in which the high temperature air has a temperature of from about 80° F. to about 60° F. and the low temperature air has a temperature of from about 45° F. to about 60° F.

35. A prefabricated chilling water system, comprising:
a duct system;
an air handling system; and
a modular water chilling system; wherein:
the duct system is in operable communication with a building that has a plurality of rooms, at least one of the rooms having a room air temperature sensor for detecting the room air temperature in the room, the duct system comprising at least one supply duct for directing low temperature air from the air handling system to the building and at least one return duct for directing high temperature air from the building to the air handling system;
the air handling system includes a plurality of air handling units, each air handling unit comprising an air inlet for receiving high temperature air from the building, a cooling coil that includes at least one conduit through which chilled chilling water flows, the cooling coil having multiple passes and positioned for heat transfer contact with the high temperature air, and a fan for increasing the static pressure of air in the air handling unit;
the modular water chilling system is installed at a location proximate the building, and is operably connected to the air handling system; and
the modular water chilling system includes at least two moveable support structures, with the two or more support structures designed to be bolted together at the location proximate the building to form the modular water chilling system, each support structure containing some of the components necessary to complete the modular water chilling system, such that when the two or more support structures are assembled together they collectively contain at least one chiller and at least one chilled water circulation pump.

36. The prefabricated chilling water system of claim 35, wherein the two or more moveable support structures further include at least one condenser water pump.

37. The prefabricated chilling water system of claim 35, wherein the two or more movable support structures further include at least one prewired motor starter.

38. The prefabricated chilling water system of claim 27, wherein the two or more movable support structures further include at least one control system.

* * * * *